United States Patent [19]

Asami et al.

[11] Patent Number: 4,667,978
[45] Date of Patent: May 26, 1987

[54] REAR HEIGHT CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Aichi, Japan

[21] Appl. No.: 833,093

[22] Filed: Feb. 26, 1986

[30] Foreign Application Priority Data

Mar. 6, 1985 [JP] Japan ................................. 60-46085

[51] Int. Cl.$^4$ ............................................ B60G 17/00
[52] U.S. Cl. .................................... 280/707; 180/41; 280/6.11; 280/DIG. 1; 340/52 R
[58] Field of Search .................. 280/6 R, 6.11, 6 H, 280/707, DIG. 1; 180/41; 340/52 R, 52 F

[56] References Cited

U.S. PATENT DOCUMENTS

| 4,540,188 | 9/1985 | Meloche et al. | 280/707 |
| 4,579,366 | 4/1986 | Doi et al. | 280/707 |
| 4,589,676 | 5/1986 | Meloche et al. | 280/707 |

FOREIGN PATENT DOCUMENTS

| 57-172808 | 10/1982 | Japan . |
| 59-23712 | 2/1984 | Japan . |
| 59-23713 | 2/1984 | Japan . |

Primary Examiner—John J. Love
Assistant Examiner—Kenneth R. Rice
Attorney, Agent, or Firm—Parkhurst & Oliff

[57] ABSTRACT

This invention relates to a rear height controller for a vehicle having a height adjuster between the body and a rear wheel. The controller includes a front height detector which detects a sporadic bump or dip of a road surface on which the vehicle is running by measuring the distance between the body and a front wheel. The front height data is sent to a bump or dip judgment section in which the height data from the right and the left height detectors is judged whether the data corresponds to a predetermined size of bump or dip. If the data is judged to correspond to a bump or dip of a predetermined size, the judgment section sends a signal to a rear height adjuster. If the right front wheel sinks into a dip, the left rear body height is lowered in order to keep the posture of the vehicle unchanged when the right rear wheel sinks into the dip. If the right front wheel rides onto a bump, the left rear body height is raised. Similarly the right rear body height is adjusted to compensate the movement of the opposite body height caused by dip or bump of the road surface. This controller maintains good vehicle control and stability when passing a sporadic dip or bump of a road surface.

6 Claims, 14 Drawing Figures

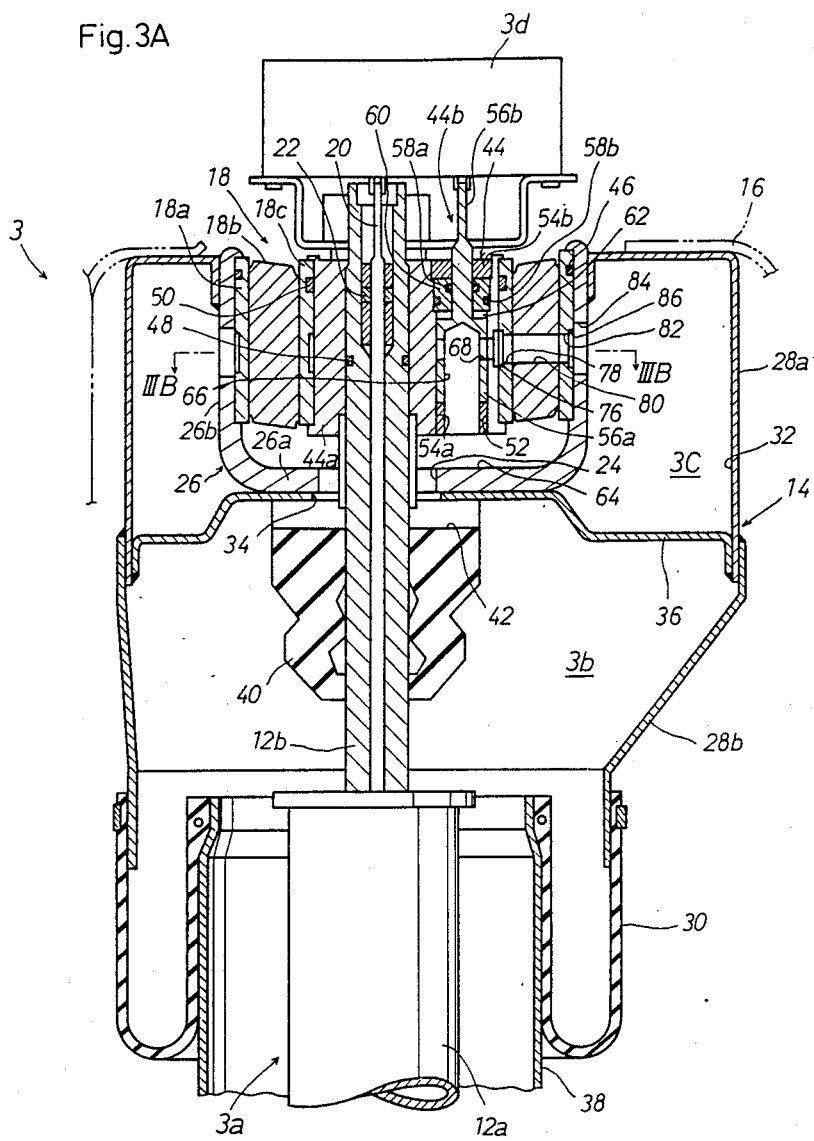

REAR HEIGHT CONTROLLER

BACKGROUND OF THE INVENTION

1. Field of the Invention

The present invention relates to a rear height controller for a vehicle, particularly to a rear height controller which is effective in keeping good control and stability of the vehicle against a single shock caused by a sporadic bump or dip of a road surface on which the vehicle is running.

2. Prior Art

Height controllers which alter a vehicle body height when the acceleration of the vertical movement of the wheels or the body detected by a body height sensor exceeds a certain level and sustains the level for more than a preset time interval, are proposed in, for example, the published unexamined Japanese patent applications Nos. 57-172808, 59-23713 and 59-23712. They are proposed in order to improve the ride comfort of the vehicle when the vehicle is running on a rough road.

However, under the above-mentioned conventional control, the vehicle is not judged to be running on a rough road until large irregularities are consecutively detected by the vehicle height sensor. When the vehicle is running on a flat road and a sporadic bump or dip of the road surface is detected by the vehicle height sensor, the conventional controllers have no effect, since the road surface having such sporadic irregularities is not judged to be a rough road by the controllers. Therefore, rolling of the vehicle is not prevented and the ride comfort is not improved by the conventional vehicle height controllers when the road surface has sporadic bumps or dips.

SUMMARY OF THE INVENTION

Accordingly, one object of this invention is to provide a novel rear height controller which appropriately controls rear height adjustment means provided between a body of a vehicle and its rear wheels, to maintain the posture of the vehicle even when it passes a sporadic bump or dip of a road surface in order to keep good control and stability of the vehicle and to provide occupants of the vehicle with good ride comfort.

The second object of the invention is to change the control height in several steps according to the size of the detected bump or dip.

These and other objects are achieved according to the invention means as shown in FIG. 1, which is a schematic block diagram indicating the basic idea of the present invention. The present novel rear height controller for a vehicle having a height adjustment means between a body and a rear wheel of the vehicle includes:

- a right front height detection means (M4) for detecting a distance between the right front wheel (WFR) and the body (M1) of the vehicle and for generating a right front height signal according to the right wheel-body distance;
- a left front height detection means (M3) for detecting a distance between the left front wheel (WFL) and the body (M1) of the vehicle and for generating a left front height signal according to the left wheel-body distance;
- a right bump judgment means (M6) for comparing the right front height signal with a predetermined first reference and for generating a right bump signal when the right front height signal exceeds the first reference;
- a right dip judgment means (M8) for comparing the right front height signal with a predetermined second reference and for generating a right dip signal when the right front height signal exceeds the second reference;
- a left bump judgment means (M5) for comparing the left front height signal with a predetermined third reference and for generating a left bump signal when the left front height signal exceeds the third reference;
- a left dip judgment means (M7) for comparing the left front height signal with a predetermined fourth reference and for generating a left dip signal when the left front height signal exceeds the fourth reference;
- a right rear height adjustment means (M9) for increasing a distance between the right rear wheel (WRR) and the body (M1) of the vehicle on receiving the left bump signal and for decreasing the right rear wheel-body distance on receiving the left dip signal; and
- a left rear height adjustment means (M10) for increasing a distance between the left rear wheel (WRL) and the body (M1) of the vehicle on receiving the right bump signal and for decreasing the left rear wheel-body distance on receiving the right dip signal.

The right and the left front height signal is, for example, indicative of a displacement of a distance between the right or left front wheel and the body from an average of the respective right or left front wheel-body distance. When the right and the left front height detection means include an analog type distance detector (1), the front height signal may be the difference between the direct output signal (VHFR(S), VHFL(S)) and the low-frequency component (VHFR(CR), VHFL(CR)) of the direct output signal which is generated as each of the right and the left front height.

Each of the right and the left bump judgment means may advantageously compare the respective front height with a plurality of predetermined references and generate a plurality of respective bump signals and each of the right and the left rear height adjustment means (M9, M10) alters the respective rear wheel-body distance in more than three states in that case.

The right and the left rear height adjustment means (M9, M10) may include a gas suspension having a gas chamber (3b, 3c, 4b, 4c) and a gas feed and discharge system (200) for feeding and discharging gas to and from the air chamber according to the bump signals and the dip signals.

The rear height controller may further comprise a calculation means for determining a time interval (Tv) during which the wheelbase of the vehicle is required to pass a point with the current speed of the vehicle. Then, each of the right and the left rear height adjustment means (M9, M10) starts feeding and discharging gas when the right or the left front wheel passes over a bump or dip of a definite size determined by the reference and stops feeding and discharging gas after the time interval Tv.

When a bump of a road surface is detected by the left front height detection means M3, the size of the irregularity is represented by the left front height signal and the left bump judgment means M5 compares the left front height signal with a predetermined first reference.

If the bump is large enough so that the left front height signal exceeds the first reference, the bump judgment means M5 generates a bump signal in order for the right rear height adjustment means to increase the distance between the vehicle body and the right rear wheel. By the increasing operation of the right rear body height, the right and the left part of the body have the same distance from the road surface when the left rear wheel rides on the bump that the left front wheel detected. Thus the posture of the vehicle is maintained unchanged even when it is passing over a single bump and the ride comfort is maintained. The same explanation is applicable for the cases of the left front wheel passing a bump and the right and the left front wheels passing a dip.

BRIEF DESCRIPTION OF THE DRAWINGS

A more complete appreciation of the invention and the attendant advantges thereof will be readily obtained by reference to the following detailed description when considered in connection with the accompanying drawing.

FIG. 3A is a sectional view of the main part of an air suspension to which the embodiments are applied.

DETAILED DESCRIPTION OF THE PREFERRED EMBODIMENTS

Figure 2:
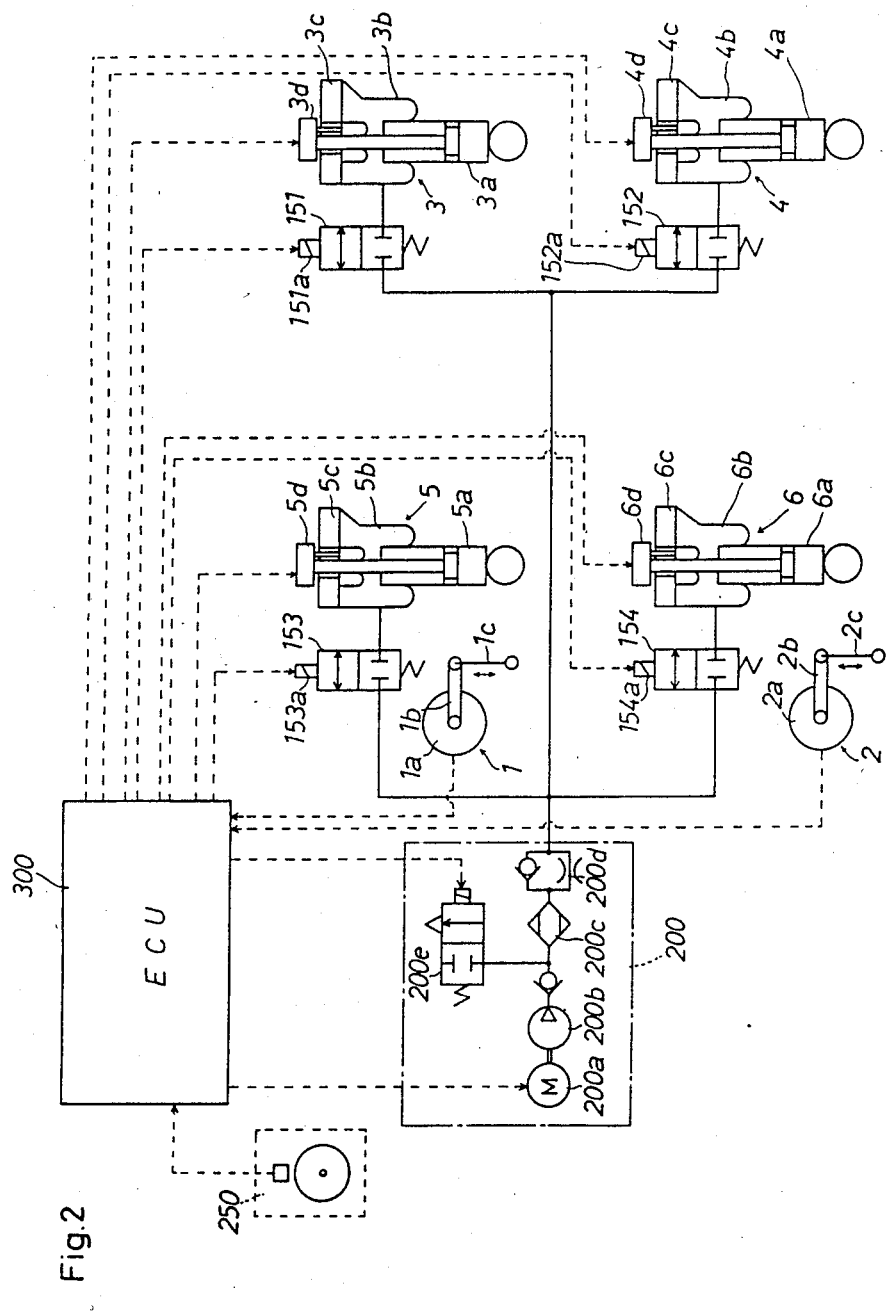
FIG. 2 is a system diagram showing an embodiment of the present invention.

Referring now to the drawings, wherein like reference numerals designate identical or corresponding parts throughout the several views, FIG. 2 shows a preferred embodiment of the rear height controller according to the invention applied to an automobile having independent air suspensions and a height adjusting system.

A right front height sensor 1 is provided between the body and right front wheel of the automobile to detect the distance between the automobile body and a right suspension arm, which follows the motion of the wheel. A left front height sensor 2 is provided between the body and left front wheel to detect the distance between the body and the left suspension arm. The short cylindrical sensor bodies 1a and 2a of the front height sensors 1 and 2 are secured on the automobile body. Links 1b and 2b extend from the center shafts of the sensor bodies 1a and 2a substantially perpendicular to the center shafts. Turnbuckles 1c and 2c are rotatably coupled to the ends of the links 1b and 2b opposite the sensor bodies 1a and 2a. The ends of the turnbuckles 1c and 2c opposite the links are rotatably coupled to portions of the suspension arms. A potentiometer, whose electric resistance changes depending on the rotation of the center shaft of each vehicle height sensor to indicate the change in the vehicle height in the form of a voltage, is built in each of the sensor bodies 1a and 2a. Although the front height sensors of the above-mentioned type are used in this embodiment, height sensors of other types may be used. For example, plural light interrupters may be provided in the body of each sensor, and a disk having a slit coaxial with the center shaft of the sensor may turn on or off the light interrupters depending on the change in the vehicle height to detect the height.

FIG. 2 also shows an air suspension 3 which is provided between a suspension arm (not shown) for the right rear wheel of the automobile and the body thereof and extends in parallel with a suspension spring (not shown). The air suspension 3 primarily includes a shock absorber 3a, a main air chamber 3b, an auxiliary air chamber 3c and an actuator 3d and has a spring function, a body height adjustment function and a shock absorber function. Similar air suspensions 4, 5 and 6 are provided for the left rear wheel, the right front wheel and the left front wheel of the automobile, respectively.

Figure 3B:
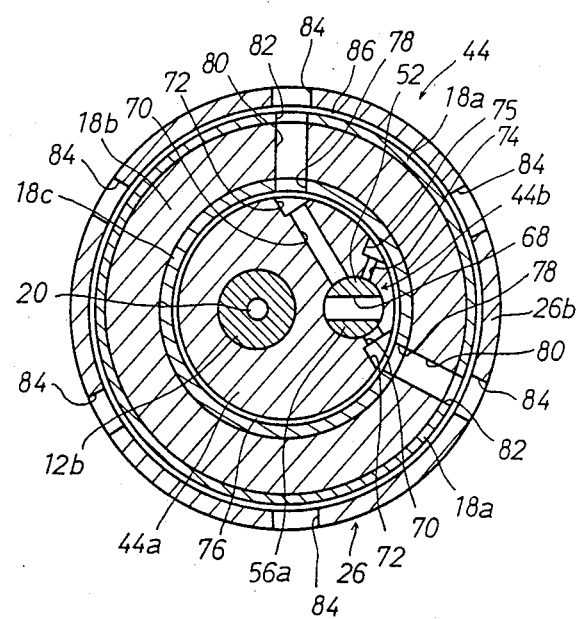
FIG. 3B is a cross sectional view along a line IIIB—IIIB shown in FIG. 3A.

FIGS. 3A and 3B show a construction of the main part of the air suspension 3. FIG. 3B shows a cross sectional view along a line IIIB—IIIB shown in FIG. 3A. The other air suspensions 4, 5 and 6 have a construction similar to the suspension 3. The air suspension 3 includes a conventional shock absorber 3a composed of a piston and a cylinder 12a, and an air spring unit 14 provided in conjunction with the shock absorber. An axle (not shown) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber 3a is a conventional buffer whose damping force can be varied for adjustment by operating the valve function of the piston. A control rod 20 for adjusting the damping force is liquid-tight and rotatably fitted with a sealing member 22 in the piston rod 12b.

The air spring unit 14 has a chamber 32 which is defined by a circumferential member 26 including a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber 3b.

The elastic cylindrical assembly 18 is disposed into the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c. The assembly 18 includes an outer cylinder 18a, a cylindrical elastic member 18b and an inner cylinder 18c which are disposed concentrically with respect to each other. The cylindrical elastic member 18b is pressfitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and and the valve casing 44a. An annular air sealing member 50 is tightly packed in between the inner cylinder 18c and the valve casing 44a.

The valve casing 44a has a hole 52 which is open at both ends and extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber 3b through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diametrical direction thereof across the recess 66.

The valve casing 44a, which houses the valve 44b, has a pair of air passages 70, each of which can communicate at one end with the communication passage 68, as shown in FIG. 4B. The air passages 70 extend on substantially the same plane outwards in a diametrical direction of the hole 52, toward the peripheral surface of the valve 44b. The other end of each air passage 70 is open to the peripheral surface of the valve casing 44a through a face hole 72. An air passage 74, which can communicate with the communication passage 68, extends on substantially the same place as the pair of air passages 70 toward the peripheral surface of the valve casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided wtih plural openings 84 which are located at equal intervals in the circumferential direction of the member 26 and extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 4B, the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber 3a, and a conventinal actuator 3d for rotating the valve 44b of the valve unit 44, are provided at the upper end of the piston rod 12b, as shown FIG. 4A.

Since the air suspension 3 has the above-mentioned construction, the air suspension performs actions described hereinafter. When the valve 44b is in a closed position, as shown in FIG. 4B, such that the communication passage 68 of the valve does not communicate with any of the air passages 70 and 74 of the valve casing 44a, the main air chamber 3b and the auxiliary air chamber 3c are disconnected from each other so that the spring constant of the suspension 3 is set at a large value. When the actuator 3d has rotated the valve 44b into such a position that the communication passage 68 of the valve communicates with the large-diameter air passages 70 of the valve casing 44a, the main air chamber 3b is connected with the auxiliary air chamber 3c through the communication passage 68, the large-diameter air passages 70 and the openings 78 and through holes 80 of the elastic assembly 18 and the openings 82 and 84, so that the spring constant of the suspension 3 is set at a small value. When the valve 44b is rotated into such a position by the regulated actuator 3d that the communication passage 68 of the valve communicates with the small-diameter communication passage 74 of the valve casing 44a, the main air chamber 3b is connected with the auxiliary air chamber 3c through the communication pasasge 68, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Leveling valves 151 through 154 are provided for the rear air suspensions 3 through 6, respectively, as shown in FIG. 2. A compressed air feed and discharge system 200, which is described below, is connected to or disconnected from the main air chambers 3b through 6b of the air suspensions 3 through 6 by the leveling valves 151 through 154 depending on whether or not electricity is supplied to solenoids 151a throught 154a. When the leveling valves 151 through 154 are opened, compressed air is fed to the air suspensions, the height of the automobile is increased. If the compressed air is discharged from the air suspensions, the height of the automobile is decreased. When the leveling valves 151 through 154 are closed, the height of the automobile is maintained.

In the compressed air feed and discharge system 200, a compressor 200b is driven by a motor 200a to produce the compressed air. An air drier 200c dries the compressed air to be fed to the air suspensions 3 through 6, to protect pipes and the parts of the air suspensions 3 through 6 from moisture and to prevent unexpected pressure change in the main air chambers 3b through 6b and the auxiliary air chambers 3c through 6c caused by a phase change of the water vapor. When the compressed air is fed to the air suspensions 3 through 6, a check valve 200d provided with a fixed orifice is opened. When the compressed air is discharged from the air suspensions 3 through 6, the check valve 200d is closed so that the air flows out through only the fixed orifice. When the compressed air is discharged from the air suspensions 3 through 6, a releasing solenoid valve 200e is driven so that the compressed air discharged from the air suspensions 3 through 6 through the fixed orifice at the check valve 200d and through the air drier 200c is released into the atmosphere. The solenoid valve 200e can be regulated to change the volume of each of the main air chambers 3b through 6b of the air suspensions 3 through 6 to adjust the height of the automobile.

A vehicle speed sensor 250 is provided in a speedometer, for example, so that the sensor sends out a pulse signal corresponding to a speed of the automobile in response to a rotating speed of an axle of the automobile.

Figure 4:
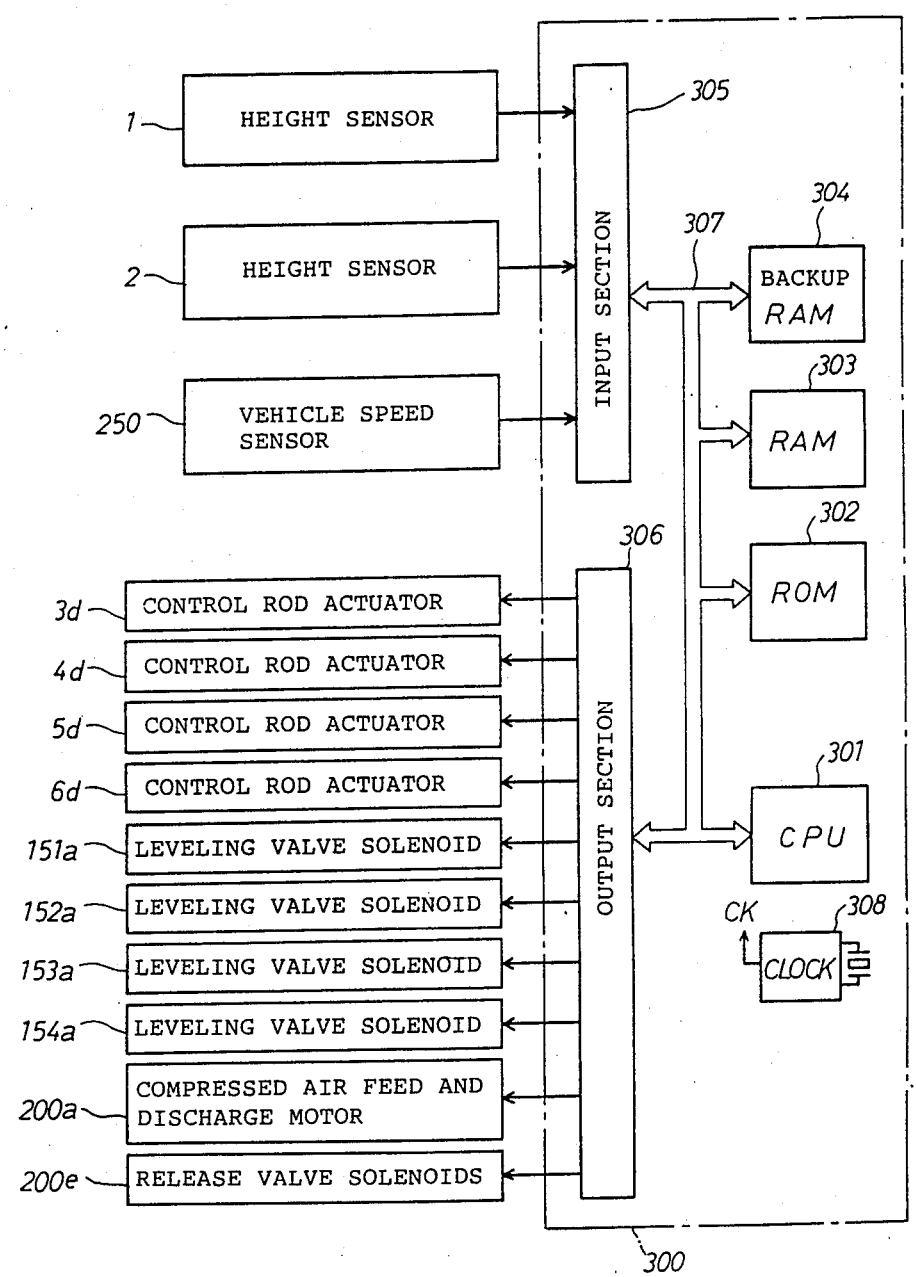
FIG. 4 is a block diagram for explaining operations of an electronic control unit (ECU) shown in FIG. 2.

The output signals of the front height detectors 1 and 2 and the vehicle speed sensor 250 are entered into an electronic control unit (ECU) 300, which processes these signals to send out drive signals to the actuators 3d through 6d of the air suspensions 3 through 6, the leveling valves 151 through 154, the motor 200a of the compressed air feed and discharge system 200 and the solenoid valve 200e to perform appropriate control when necessary. FIG. 4 shows a construction of the ECU 300. A central processing unit (CPU) 301 receives the output data from the sensors and performs operations on the data, in accordance with a control program, to carry out process steps for the control of various units or means or the like. The control program and initial data are stored in a read-only memory (ROM) 302. The data, which are entered in the ECU 300, and data necessary for operations and control, are stored into and read out of a random-access memory (RAM) 303. A backup RAM 304 is backed up by a battery so that even if the ignition key switch of the automobile is turned off, the backup RAM retains data which are needed after the turning-off of the switch. An input section 305 includes an input port (not shown), a waveshaping circuit if necessary, a multiplexer which selectively sends out the output signals of the sensors to the CPU 301 and an A/D converter which converts an analog signal into a digital signal. An output section 306 includes an output port (not shown) and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at preset intervals to the CPU 301, the ROM 302, the RAM 303 and so forth so that a control timing is set by the clock signal.

Figure 5A:
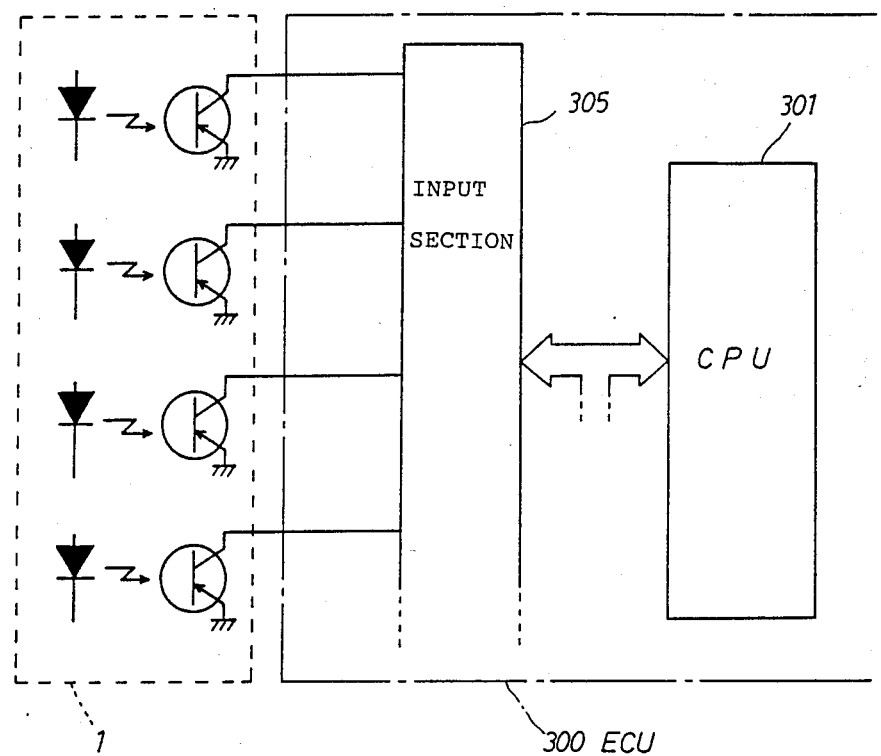
FIG. 5A is digital type front height sensor and the corresponding input section of the ECU.
Figure 5B:
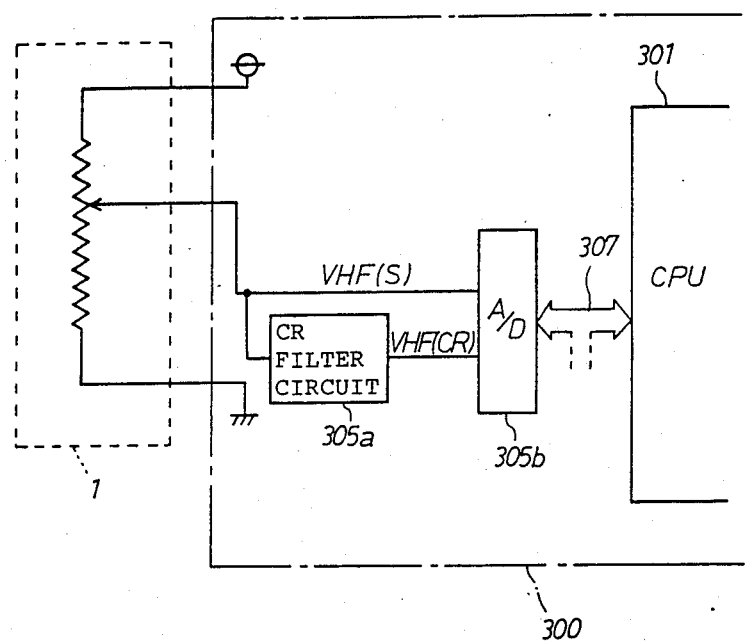
FIG. 5B is an analog type front height sensor and the corresponding input section of the ECU.

If the output signal of the front height sensor 1 is a digital signal, the signal is transmitted to the CPU 301 through the input section 305 including a buffer as shown in FIG. 5A. If the output signal of the front height sensor 1 is an analog signal, a construction as shown in FIG. 5B is adopted. In the latter case, the front height sensor 1 sends out the analog signal of a voltage corresponding to the distance between the body and the right front wheel of the automobile. The analog voltage signal is converted into a voltage VHFR(CR) indicating an average height of the vehicle, by a CR filter circuit 305a constructed as a low-pass filter. The voltage VHFR(CR) is applied to an A/D converter 305b. The analog voltage signal is also directly applied as a voltage VHFR(S) indicating the current height of the vehicle, to the A/D converter 305b. The converter 305b changes both the input signals into digital signals through the action of a multiplexer. The digital signals are transmitted from the converter the CPU 301. The same thing applies to the left front height sensor 2.

Figure 6A:
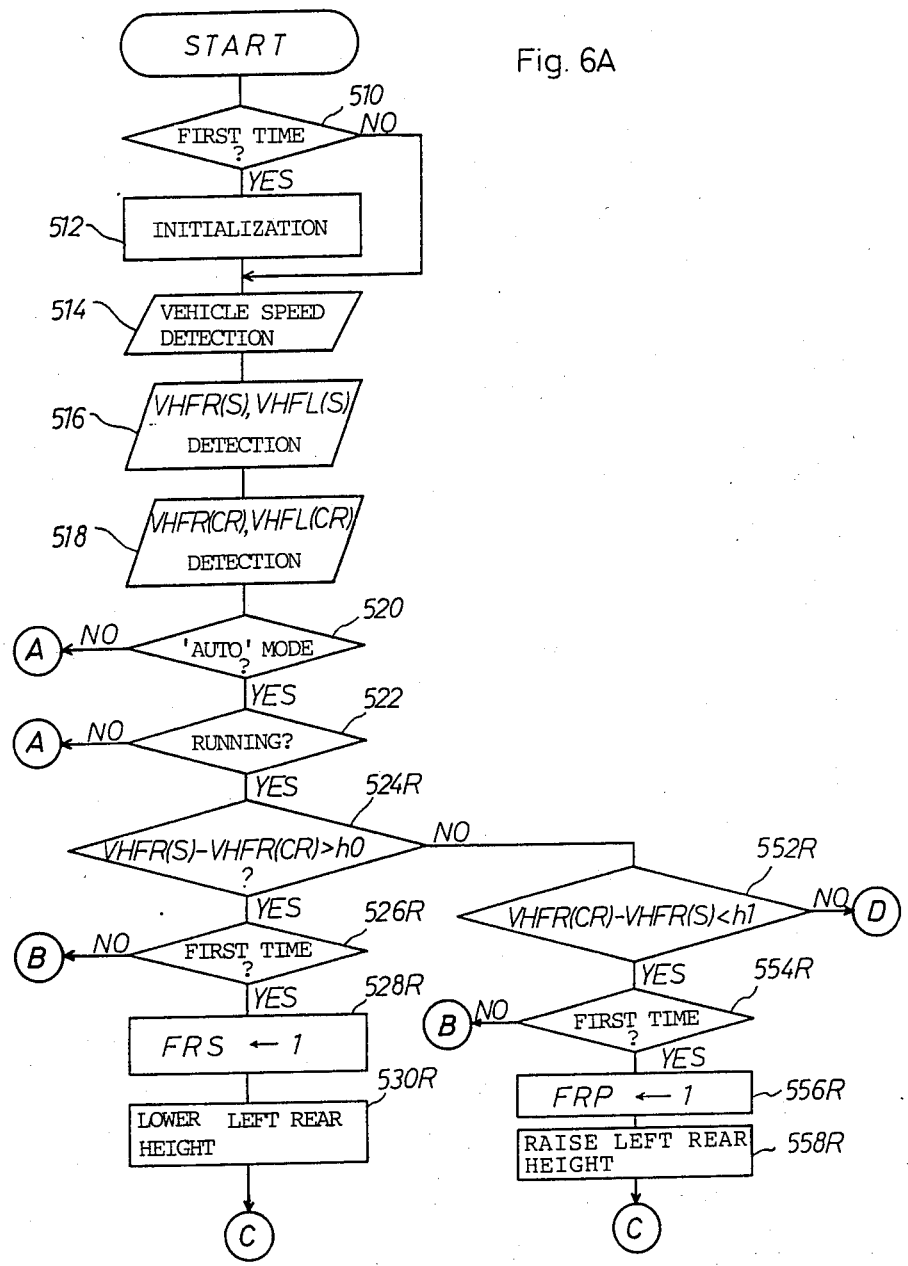
FIG. 6(A), 6(B) and 6(C) is a flowchart showing a main processing routine which is performed by the ECU in the embodiment.
Figure 6B:
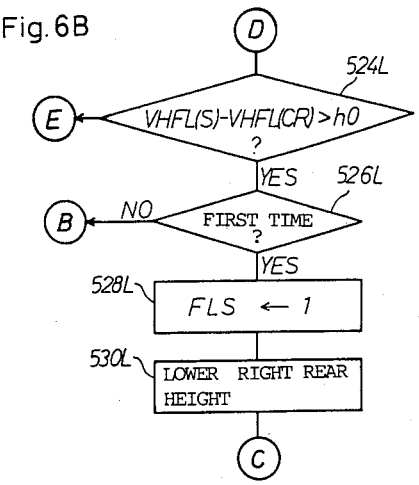
Figure 6C:
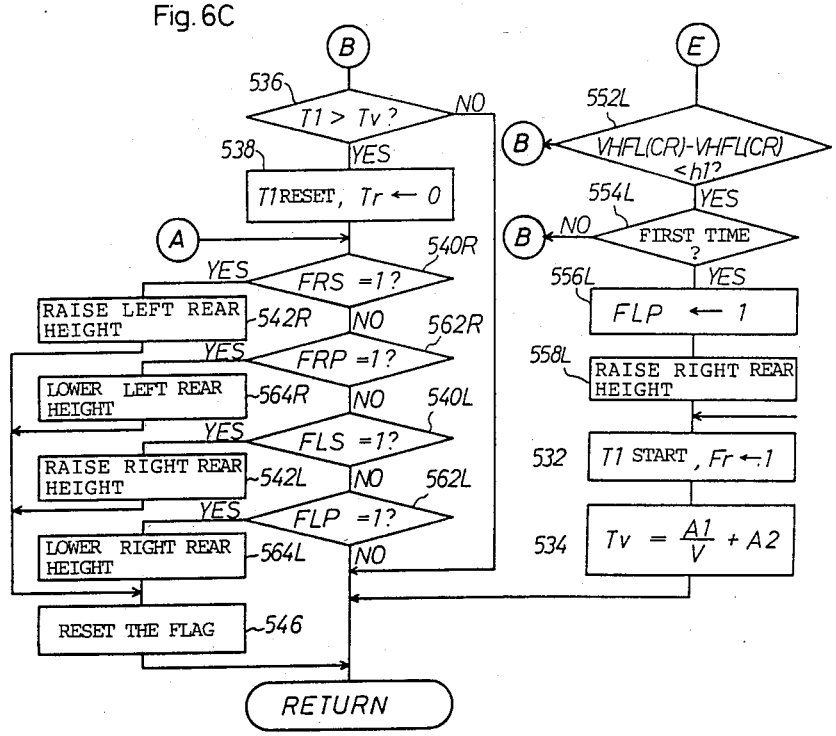
Figure 6D:
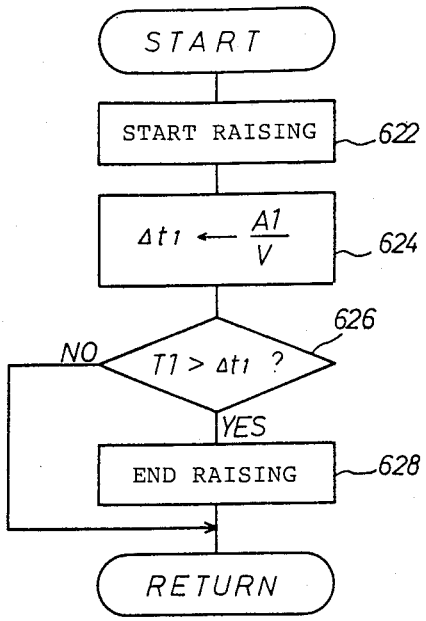
FIG. 6(D) and FIG. 6(E) are flowcharts showing subsidiary processing routines for specially controlled increasing and decreasing operations of the rear body-wheel distance.

The process steps, which are performed by the ECU 300 in this embodiment utilizing an analog type front height sensors, are hereinafter described referring to flowcharts shown in FIGS. 6A, 6B, 6C, 6D, 6E, 7 and 8. The main routine represented by the flowchart of FIG. 6A, 6B, 6C is repeatedly performed in every preset time interval, such as 5 msec. An outline of the process steps shown in the flowchart is described as follows, with the step number in the parentheses:

(1) A current right front height VHFR(S) and a current left front height VHFL(S) are input directly from the front height sensors 1 and 2 and an average right front height VHFR(CR) and an average left front height VHFL(CR) are input through the CR filter circuit 305a (516, 518).

(2) It is judged whether or not the current right front height VHFR(S) is greater than a predetermined reference h0 plus the average right height VHFR(CR) (524R). When the condition is satisfied, it means that the right front wheel has sunken into a definite size of dip of a road surface.

(3) If the difference between the current right front height VHFR(S) and the average right front height VHFR(CR) is greater than the reference h0, the distance between the left rear wheel and the body of the automobile is decreased (530R), i.e. the left rear body height is lowered, in order to prepare the sinking down of the right rear wheel into the dip. In particular, the leveling valve 152 is opened by driving the solenoid 152a from the ECU and the solenoid valve 200e is also opened to release the air in the main air chamber 4b of the air suspension 4.

(4) It is judged whether or not the current right front height VHFR(S) is less than the average right front height VHFR(CR) minus a predetermined reference h1 (552R). When the condition is satisfied, it means that the right front wheel has ridden onto a definite size of bump of a road surface.

(5) If the difference between the average right front height VHFR(CR) and the current right front height VHFR(S) is greater than the reference h1, the distance between the left rear wheel and the body of the automobile is increased (558R), i.e. the left rear body height is raised, in order to prepare the riding up of the right rear wheel onto the bump. In particular, the leveling valve 152 is opened by driving the solenoid 152a from the ECU and air is fed to the main air chamber 4b of the air suspension 4 from the air compressor 20b.

(6) Similarly, when the left front wheel sinks into a definite size of dip determined by another reference the right rear body height is lowered and when the left front wheel rides onto a definite size of bump determined by still another reference the right rear body height is heightened.

(7) After the body height alteration processings as described above, the body height is returned to the original state when the rear wheel passes the bump or dip (542R, 542L, 564R, 564L).

The details of the process steps of the main and subsidiary routines are hereinafter described. The main routine is repeatedly performed in every 5 msec.

It is first judged whether or not the present cycle of the routine is being performed for the first time since the activation of the ECU 300 (510). If it is judged to be being performed for the first time, the initial setting is performed (512), all variables are cleared and all flags are reset. After the initial setting is performed or if the routine is judged to be being performed for the second time or later, the speed V of the automobile is detected (514) in terms of the output signal of the vehicle speed sensor 250. Then current right and left front heights VHFR(S) and VHFL(S) are then detected (516). Averages of the right and the left front heights VHFR(CR) and VHFL(CR) are then determined (518). In this embodiment, each of the average right and left front heights VHFR(CR) and VHFL(CR) is directly determined as the output signal of the front height sensors 1 and 2 through the CR filter circuit 305a shown in FIG. 5B.

If the right front height sensor 1 is sending out a digital signal, the average right front height VHFR(CR) may be calculated from past right front heights VHFR(S) in the ECU 300. For example, the calculation can be performed by adopting a routine of the process steps shown in FIG. 7, instead of the process steps 516 and 518 of FIG. 6A. In the routine shown in FIG. 7, a current right front height VHFR(S)n is detected first (710), and the average VHFRa,n is then calculated (730, 740) at every preset time interval tms (720). In step 730, the following calculation is performed:

$$VHFR, n = [(k-1)VHFRa, n-1 + VHFRb, n-1 + VHFR(S)n]/k$$

k: Number of measured values to be averaged
VHFRa,n: Average to be calculated currently (n−th time)
VHFRa,n−1: Average calculated previously ((n−1)-th time)
VHFR(S)n: Measured value of current right front height
VHFRb,n−1: Value calculated previously In step 740, the value VHFRb,n is calculated as follows:

$$VHFRb, n = \mathrm{mod}(k)[(k-1)VHFRa, n-1 + VHFRb, n-1 + VHFR(S)n]$$

In the calculation, mod(A) {B} means the value of the remainder in the division of B by a. The process steps 730 and 740 constitute such a method that a value approximate to the average can be calculated if only the values VHFRa,n, VHFRa,n−1 and VHFRb,n−1 are stored in a memory beforehand. As for this method, past full (k−1) pieces of data are not needed to be stored in the memory, so that both the memory and the calculation are saved. If the memory and the calculation are sufficient for use, a reuired number of measured values may be averaged by known methods.

After the determination of the average (518) shown in FIG. 6A, it is judged (520) whether or not the suspension control is in an automatic mode. If the driver of the automobile has not selected the automatic mode by a manual switch, the present cycle of the routine is terminated. If he has selected the automatic mode, it is judged (522) whether or not the automobile is running. If the output of the vehicle seed sensor 250 is not less than a preset value, the automobile is judged to be running. If the automobile is judged to be running it is then judged (524R) whether or not the difference VHFR(S)−VHFR(CR) is greater than a predetermined value h0. If the difference is greater than h0, it is then judged (526R) whether or not the present cycle of the routine is the first time since the difference has exceeded the value h0. If the result is 'YES', a flag FRS, which is for indicating that the right front wheel has sunken into a definite size of dip of a road surface when set, is set (528R) and the lowering operation of the left rear body height is performed (530R). In particular, the solenoid 152a is driven to open the leveling valve 152 and the release solenoid 200e is opened for a preset time interval. *t1 to release the air in the main air chamber 4b of the left rear air suspension 4 to the atmosphere. By this lowering operation of the left rear body, the posture of the automobile is maintained unchanged and the rolling is prevented when the right rear wheel sinks into the dip of the road surface that the right front wheel has passed.

Figure 8:
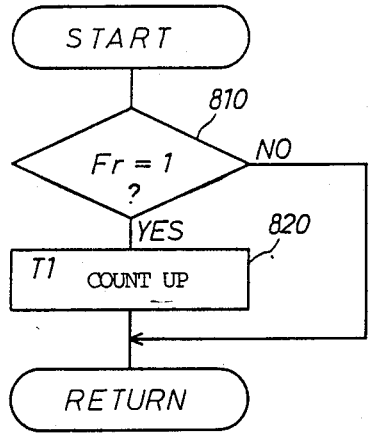
FIG. 8 is a processing routine for counting up a timer for measuring elapse of time.

Then a timer T1 is started counting and a flag Fr is set (532). The timer T1 is for counting the time interval for which the rear body height is to be changed and the flag Fr is for judging whether or not the timer T1 should be counted as shown in FIG. 8. The flowchart of FIG. 8 shows an interrupt routine performed in every preset time, where the timer T1 is counted up (820) if the flag Fr is set (810). Then a time interval Tv for which the rear body height should be lowered or raised is calculated (534) on the basis of the vehicle speed V as follows:

$$Tv = (A1/V) + a2$$

A1: Wheelbase
A2: Compensatory term (constant)

The compensatory term A2 is determined in consideration of the detection lags of the front height sensors 1 and 2, the time taken for the rear wheel to pass the bump or dip of the road surface, etc. The present cycle of the main routine ends here.

In step 526R of the following cycles of the routine, the result of the judgment is NO and then it is judged (536) whether or not the timer T1 is greater than the reference time interval Tv. If the result is 'NO', the present cycle of the routine ends. If the result is 'YES', i.e. the time interval Tv has elapsed since the left rear body height was lowered, the timer T1 is reset and the flag Fr is also reset (538). Accordingly the timer T1 will not be counted up in the counting step 810 of FIG. 8. Then, for judging whether or not to return the lowered left rear body height to the original height, it is judged (540R) whether or not the flag FRS is set. If the left rear body height has been lowered, the result is 'YES' and the left rear body height is raised to the original height (542R) and the flag FRS is reset (546). In definite, the solenoid 152a is driven to open the leveling valve 152 and air is fed to the main air chamber 4b of the left rear air suspension 4 from the compressor 200b for a time interval Δt2. Since then the automobile runs as usual.

If the result of the judgment of step 524R is 'NO', i.e. the right front wheel does not sink into a definite size of dip, it is then judged (552R) whether or not the difference VHFR(CR)−VHFR(S) is less than h1. The following steps 554R and 556R are similar to prescribed steps 526R and 258R: the judgment whether or not the present cycle of the routine is the first time since the difference has exceeded h1 (554R); a flag FRP, which is for indicating that the right front wheel has ridden onto a definite size of bump of a road surface when set, is set (556R); and the raising operation of the left rear body height is performed (558R). In particular, the solenoid 152a is driven to open the leveling valve 152 and air is fed to the main air chamber 4b of the left rear air suspension 4 from the compressor 200b. By this raising operation of the left rear body, the posture of the automobile is kept unchanged and rolling is prevented when the right rear wheel rides onto the bump of the road surface that the right front wheel has passed. Then steps 532 and 534 are performed as described before and the present cycle of the routine ends.

As for the returning process steps of the raised left rear body height, it is judged whether or not the time interval Tv has elapsed (536) and whether or not the flag FRP is set (562R), and the raised left rear body height is lowered to the original height (564R) and the flag FRP is reset (546) if the two judgment results are both 'YES'.

When the left front wheel encounters a dip or a bump of a road surface, the process steps are performed similarly as those described above and if the size of the dip or the bump is large enough that the difference between the current left front height VHFL(S) and the average left front height VHFL(CR) exceeds predetermined references h0 or h1, the right rear body height is lowered or raised according to the road surface. steps 524L through 530L correspond to steps 524R through 530R and steps 552L through 558L to steps 552R through 558R. In those steps, If the left front wheel meets a definite size of dip the right rear body height is lowered and if the left front wheel meets a definite size of bump the right rear height is raised. And in steps 540L and 542L the lowered right rear body height is raised and in steps 562L and 564L the raised right rear body height is lowered to the original height.

By these steps, by those process steps the right and left rear body height are properly lowered or raised to compensate the dip down and the riding up of the oposite rear wheel to maintain the resulting automobile posture and to prevent deleterious rolling of the automobile body.

In the above described processing steps, the release valve 200e is opened to release the air in the main air chambers 3b and 4b for the time interval Δt1 and the air is fed for the time interval Δt2, meaning that the lowering and raising displacement is set to be a fixed value. However, the lowering and raising displacements may be set to a plurality of values according to the size of the dip or bump that the wheels pass.

The displacements may be varied depending on the vehicle speed V. In that case, the right or the left rear body height is under a lowering operation or under a raising operation until the right or the left rear wheel meets the dip or the bump.

In case of passing a bump, for example, the routine shown in FIG. 6B is effected after the setting of the routine T1 and the flag Fr in step 532 of FIG. 6C. First in the routine of FIG. 6B the raising operation is started in step 622. Then the time interval Δt1 is calculated (624) as $$\Delta t1 = A1/V,$$

where A1 is the wheelbase and V is the current vehicle speed. When the timer T1 elapses the time interval t1, i.e. when the right or the left rear wheel comes to the bump which the left or the right front wheel has passed, the raising operation is started (626, 628).

Figure 6E:
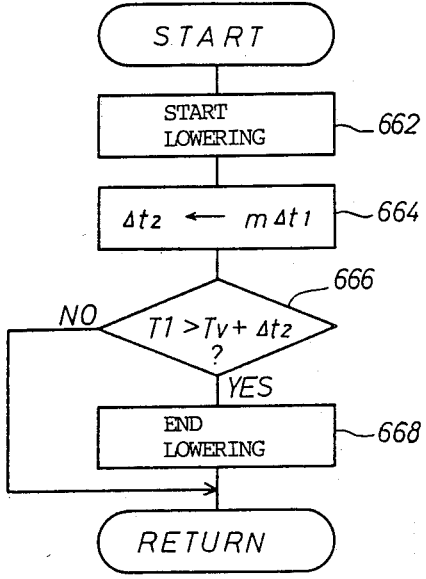
Figure 7:
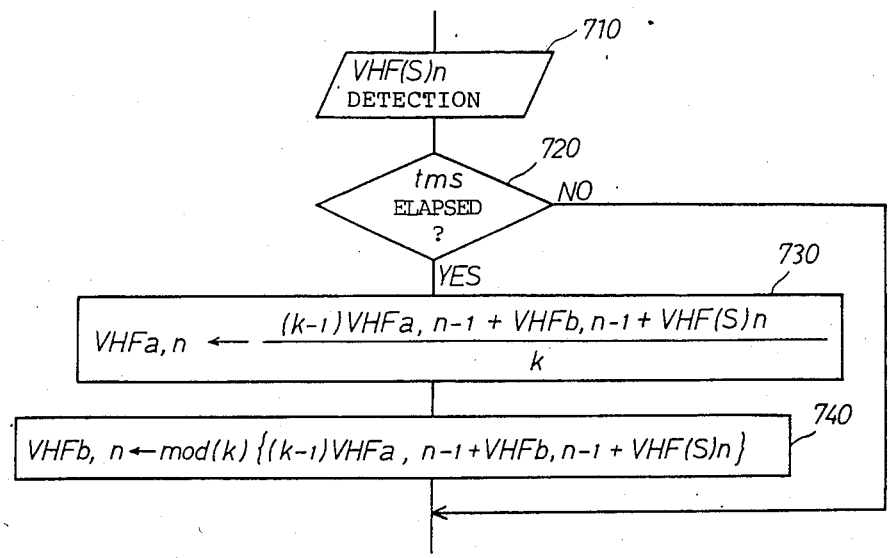
FIG. 7 is a processing routine for calculating an average of the front height signal.

In order to lower, or return, the raised right or left rear body height, T1 is not reset in step 538 of FIG. 6C and the routine of FIG. 6E is performed as steps 564R and 564L of FIG. 6C. First in step 662 of FIG. 6E the lowering operation is started and the time interval Δt2 is calculated as $$\Delta t2 = m \times \Delta t1,$$

where m = (a time interval needed to lower a definite distance) / (a time interval needed to raise the definite distance).

Figure 1:
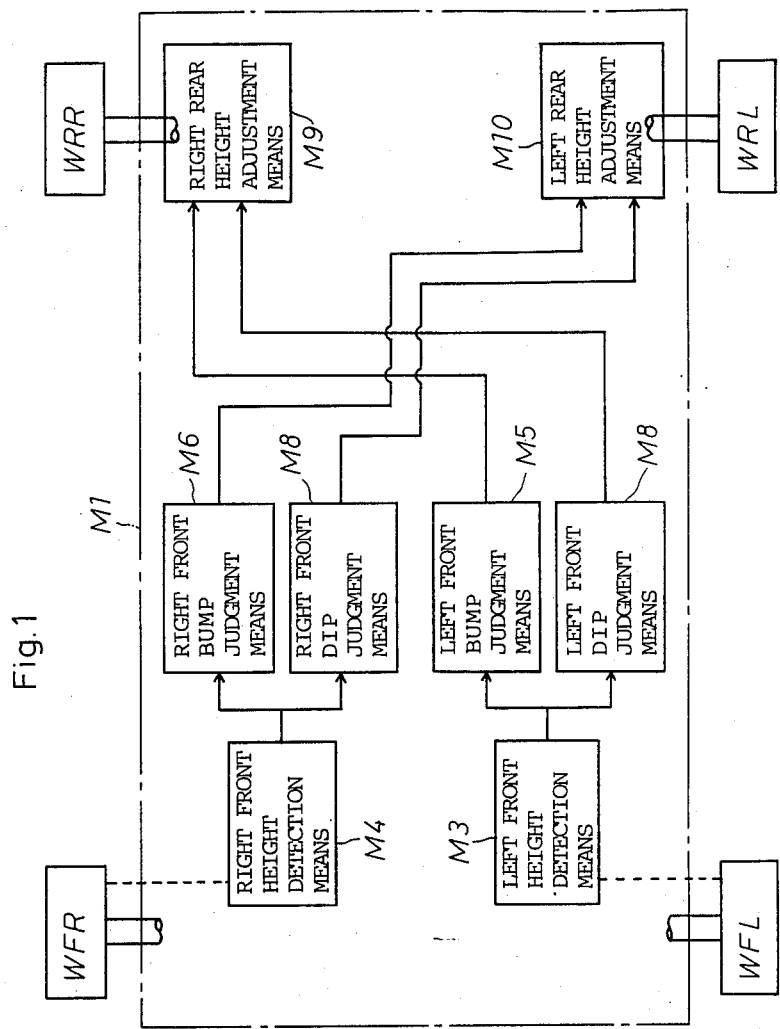
FIG. 1 is a schematic block diagram showing the basic idea of the present invention.

In the embodiment described above: the right and the left front height sensors 1 and 2 correspond to the right and left front height detection means M4 and M3 of FIG. 1; the compressor 200b, the leveling valves 151 and 152 and the air suspensions 3 and 4 to the right and the left rear height adjustment means M9 and M10; and steps 524R, 524L, 552R and 552L to the right and the left bump and dip judgment means M6, M5, M8 and M7.

What is claimed is:

1. A rear height controller for a vehicle having a height adjustment means between a body and a rear wheel of the vehicle comprising:
   a right front height detection means for detecting a distance between the right front wheel and the body of the vehicle and for generating a right front hight signal according to the right wheel-body distance;

a left front height detection means for detecting a distance between the left front wheel and the body of the vehicle and for generating a left front hight signal according to the left wheel-body distance;

a right bump judgment means for comparing the right front height signal with a predetermined first reference and for generating a right bump signal when the right front height signal exceeds the first reference;

a right dip judgment means for comparing the right front height signal with a predetermined second reference and for generating a right dip signal when the right front height signal exceeds the second reference;

a left bump judgment means for comparing the left front height signal with a predetermined third reference and for generating a left bump signal when the left front height signal exceeds the third reference;

a left dip judgment means for comparing the left front height signal with a predetermined fourth reference and for generating a left dip signal when the left front height signal exceeds the fourth reference;

a right rear height adjustment means for increasing a distance between the right rear wheel and the body of the vehicle on receiving the left bump signal and for decreasing the right rear wheel-body distance on receiving the left dip signal; and a left rear height adjustment means for increasing a distance between the left rear wheel and the body of the vehicle on receiving the right bump signal and for decreasing the left rear wheel-body distance on receiving the right dip signal.

2. A rear height controller according to claim 1 wherein each of the right and the left front height signals indicates a displacement of a distance between the right or the left front wheel and the body from an average of the respective right and left front wheel-body distance.

3. A rear height controller according to claim 2 wherein each of the right and the left front height detection means comprises an analog type distance detector and the difference between the direct output signal of the analog type detector and the low-frequency component of the direct output signal is generated as each of the right and left front height signals.

4. A rear height controller according to claim 1 wherein each of the right and the left bump judgment means compares the respective right and left front height signal with a plurality of predetermined references and generates a plurality of respective bump signals and each of the right and the left rear height adjustment means increases or decreases the respective rear wheel-body distance in more than three steps.

5. A rear height controller according to claim 1 wherein each of the right and the left rear height adjustment means comprises a gas suspension including a gas chamber and a gas feed and discharge means for feeding and discharging gas to and from the gas chamber according to the bump signals and the dip signals.

6. A rear height controller according to claim 5 wherein the rear height controller further comprises a calculation means for determining a time interval Tv during which the wheelbase of the vehicle is required to pass a point with the current speed of the vehicle, and wherein each of the right and the left rear height adjustment means starts feeding or discharging gas at a time when the right or the left bump or dip judgment means generates the right or the left bump or dip signal and stops feeding or discharging gas after the time interval Tv.

* * * * *